(12) United States Patent
Buibas et al.

(10) Patent No.: US 11,205,094 B2
(45) Date of Patent: *Dec. 21, 2021

(54) MULTI-ANGLE RAPID ONBOARDING SYSTEM FOR VISUAL ITEM CLASSIFICATION

(71) Applicant: ACCEL ROBOTICS CORPORATION, San Diego, CA (US)

(72) Inventors: Marius Buibas, San Diego, CA (US); John Quinn, San Diego, CA (US); Tanuj Pankaj, San Diego, CA (US); Chin-Chang Kuo, San Diego, CA (US)

(73) Assignee: ACCEL ROBOTICS CORPORATION, San Diego, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 16/848,778

(22) Filed: Apr. 14, 2020

(65) Prior Publication Data

US 2021/0124994 A1 Apr. 29, 2021

Related U.S. Application Data

(63) Continuation-in-part of application No. 16/667,794, filed on Oct. 29, 2019, now Pat. No. 10,621,472.

(51) Int. Cl.
*G06K 9/62* (2006.01)
*H04N 5/272* (2006.01)
(Continued)

(52) U.S. Cl.
CPC ......... *G06K 9/6256* (2013.01); *G06K 9/6267* (2013.01); *G06T 3/40* (2013.01);
(Continued)

(58) Field of Classification Search
CPC ...... G06K 9/6256; G06K 9/6267; G06T 3/40; G06T 3/60; H04N 5/247; H04N 5/272
See application file for complete search history.

(56) References Cited

U.S. PATENT DOCUMENTS 5,016,035 A * 5/1991 Myles, Jr. .............. G03B 17/40
396/2
9,367,770 B2 6/2016 Footen
(Continued)

FOREIGN PATENT DOCUMENTS

WO 2019119047 A1 6/2019

OTHER PUBLICATIONS

International Search Report and Written Opinion issued in PCT/US20/58053 dated Jan. 26, 2021 (8 pages).
(Continued)

*Primary Examiner* — Kevin Ky
(74) *Attorney, Agent, or Firm* — Arc IP Law, PC; Joseph J. Mayo

(57) ABSTRACT

System that facilitates rapid onboarding of an autonomous (cashier-less) store by capturing images of the store's items from multiple angles, with varying backgrounds, and that builds a classifier training dataset from these images. The system may have cameras in different positions, and backgrounds that generate different background colors. It may have a platform for items that can be switched between a transparent and non-transparent state; cameras below the platform may therefore capture images of the bottom side of the item when the platform is transparent. When an item is placed in the imaging system, a fully automated process may generate a sequence of background colors and may capture and process images from all of the cameras to create training images. Images of the item from multiple angles, including views of the entire external surface of the item, may be captured without requiring an operator to move or reorient the item.

20 Claims, 14 Drawing Sheets
(12 of 14 Drawing Sheet(s) Filed in Color)

(51) Int. Cl.
  *G06T 3/40*  (2006.01)
  *G06T 3/60*  (2006.01)
  *H04N 5/247* (2006.01)

(52) U.S. Cl.
  CPC ............... *G06T 3/60* (2013.01); *H04N 5/247* (2013.01); *H04N 5/272* (2013.01)

(56) References Cited

U.S. PATENT DOCUMENTS

| | | | | |
|---|---|---|---|---|
| 9,727,838 | B2 | 8/2017 | Campbell | |
| 9,779,546 | B2* | 10/2017 | Hunt | G01B 11/00 |
| 10,621,472 | B1 | 4/2020 | Buibas et al. | |
| 2005/0195216 | A1* | 9/2005 | Kramer | G09G 3/003 345/619 |
| 2006/0064308 | A1* | 3/2006 | Foehr | G06Q 30/06 705/26.1 |
| 2006/0114356 | A1* | 6/2006 | Didow | G03B 15/07 348/587 |
| 2008/0027817 | A1* | 1/2008 | Iizaka | G07G 3/006 705/20 |
| 2008/0166111 | A1* | 7/2008 | Didow | G03B 15/07 396/3 |
| 2010/0150403 | A1* | 6/2010 | Cavallaro | G08B 21/0476 382/107 |
| 2010/0150536 | A1* | 6/2010 | Ryckman | G03B 31/00 396/2 |
| 2011/0140380 | A1* | 6/2011 | Ulrich | B62B 5/0096 280/33.992 |
| 2011/0211819 | A1* | 9/2011 | Reno | G03B 15/02 396/2 |
| 2012/0011540 | A1* | 1/2012 | Pulford | G06Q 20/384 725/32 |
| 2012/0206558 | A1* | 8/2012 | Setton | H04N 7/147 348/14.03 |
| 2012/0206560 | A1* | 8/2012 | Setton | H04N 7/147 348/14.08 |
| 2013/0141513 | A1* | 6/2013 | Setton | G06Q 30/0641 348/14.01 |
| 2013/0141515 | A1* | 6/2013 | Setton | H04N 7/157 348/14.03 |
| 2013/0176481 | A1* | 7/2013 | Holmes | H04N 5/23245 348/370 |
| 2013/0283154 | A1* | 10/2013 | Sasakura | G06F 40/106 715/253 |
| 2014/0002677 | A1* | 1/2014 | Schinker | H04N 5/272 348/207.1 |
| 2014/0009475 | A1* | 1/2014 | Setton | G06Q 30/00 345/473 |
| 2014/0152507 | A1* | 6/2014 | McAllister | H01Q 1/362 342/126 |
| 2014/0176565 | A1* | 6/2014 | Adeyoola | G06F 16/5854 345/473 |
| 2014/0244494 | A1* | 8/2014 | Davis | G06Q 20/227 705/41 |
| 2014/0244495 | A1* | 8/2014 | Davis | G06Q 20/326 705/41 |
| 2014/0244514 | A1* | 8/2014 | Rodriguez | G06Q 20/3223 705/71 |
| 2014/0258110 | A1* | 9/2014 | Davis | G06Q 30/0611 705/41 |
| 2015/0104162 | A1* | 4/2015 | Crasnianski | G03B 17/53 396/2 |
| 2015/0227922 | A1* | 8/2015 | Filler | G06F 3/0486 705/41 |
| 2015/0304554 | A1* | 10/2015 | Matsubara | G03B 17/53 348/239 |
| 2016/0040982 | A1* | 2/2016 | Li | G01C 3/00 356/603 |
| 2017/0011606 | A1* | 1/2017 | Ceccon | G06Q 20/18 |
| 2017/0053506 | A1* | 2/2017 | Alexis | G08B 13/2434 |
| 2017/0083884 | A1* | 3/2017 | Vilmosh | G06K 9/6202 |
| 2017/0103515 | A1* | 4/2017 | Hulth | G06K 17/0022 |
| 2018/0234627 | A1* | 8/2018 | Kim | H04N 5/23232 |
| 2018/0240092 | A1* | 8/2018 | Miyagi | G06Q 20/208 |
| 2018/0288300 | A1* | 10/2018 | Crooks | H04N 5/2352 |
| 2019/0220692 | A1 | 7/2019 | Wu | |

OTHER PUBLICATIONS

Smartglass, "PDLC Smart Film", retrieved from https://smartglassla.com/smart-film/ on Feb. 20, 2021.

Curbell Plastics, "Acrylic Sheet Light Diffusing", retrieved from https://www.curbellplastics.com/Shop-Materials/All-Materials/Acrylic/Acrylic-Sheet-Light-Diffusing#?Shape=CRBL.SkuSheet on Feb. 20, 2021.

* cited by examiner

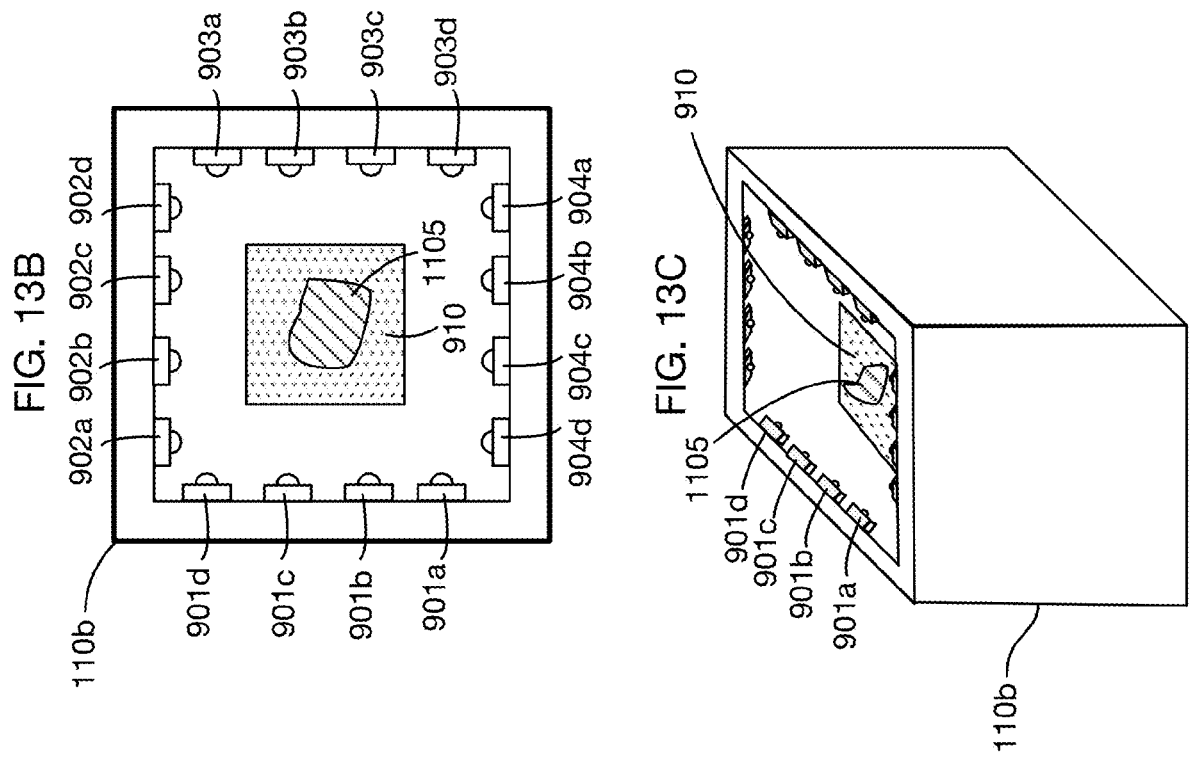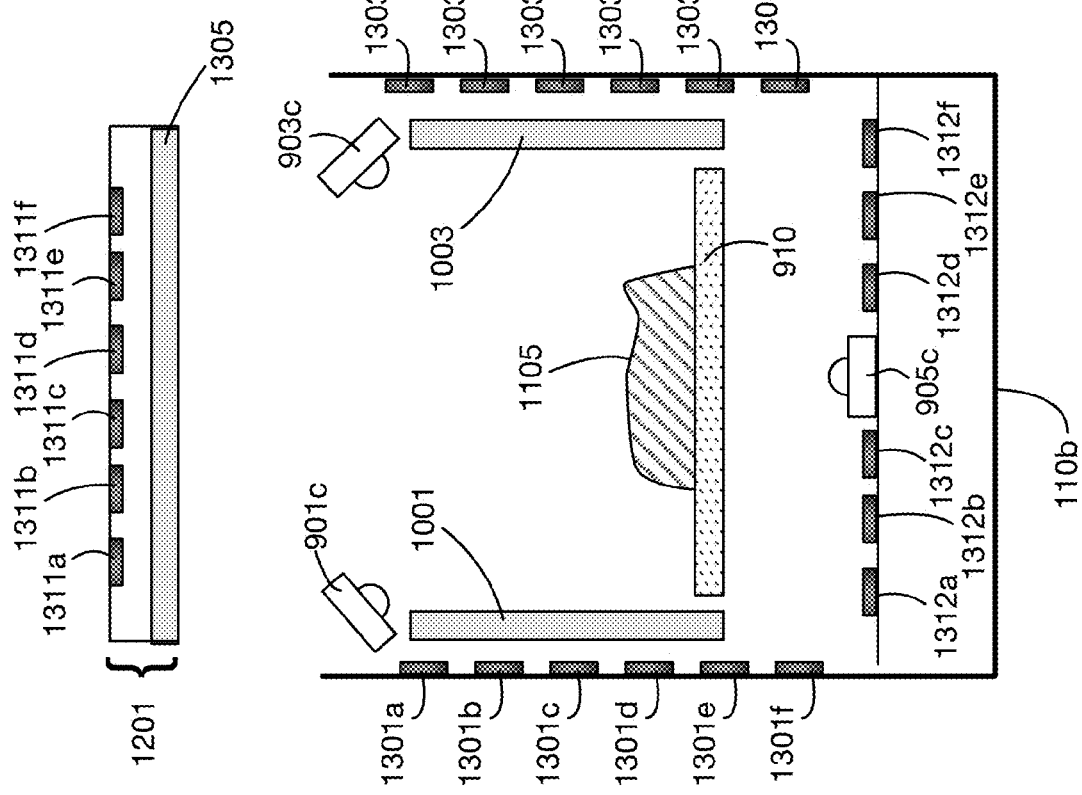

MULTI-ANGLE RAPID ONBOARDING SYSTEM FOR VISUAL ITEM CLASSIFICATION

This application is a continuation-in-part of U.S. Utility patent application Ser. No. 16/667,794, filed 29 Oct. 2019, the specification of which is hereby incorporated herein by reference.

BACKGROUND OF THE INVENTION

Field of the Invention

One or more embodiments of the invention are related to the fields of image analysis, artificial intelligence, and automation. More particularly, but not by way of limitation, one or more embodiments of the invention enable a system that supports rapid onboarding of items, for example for an autonomous store that uses visual item classification to identify items selected by shoppers.

Description of the Related Art

Autonomous stores that allow shoppers to select items and checkout without a cashier are becoming more popular. Some autonomous stores use cameras to identify the items that shoppers select from product shelves based on the items' visual appearance. For example, camera images may be input into a classifier that is trained to recognize items available in the store. Product classification requires the collection of sets of images for the products in different orientations and lighting conditions. Once images are labeled with the corresponding product, they are fed into training algorithms that modify the classifier parameters (usually a neural network, modifying weights) to maximize accuracy. There are many algorithms for training and classification, but all require a representative data set of what the product will look like in an environment where it will be observed.

This "onboarding" process to set up the item images for a store can be extremely time-consuming, particularly for stores with thousands of items and high item turnover as packaging for items changes over time and new items introduced. A typical workflow used in the art for this onboarding process is to manually capture images of each product from various angles and under various conditions. Further manual processing is typically required to crop and prepare item images for a training dataset. The process to onboard a single item may take 15 to 30 minutes. For stores with large numbers of items, onboarding the store's complete catalog may take multiple months, at which time many of the product's packaging may have changed. There are no known systems that automate the onboarding process so that multiple item images can be captured and prepared quickly and with minimal labor.

In many situations, visual item classification may require images of each item from multiple angles. For example, a shopper may take an item from a shelf and then replace it upside-down; without an image of the bottom side of the item, an item classifier may be unable to recognize the item if it is subsequently taken from the shelf. Onboarding of items may therefore require capturing of item images from all sides and angles. This may require time-consuming manual steps of reorienting the item to capture additional images. There are no known systems that automatically capture images of an item from multiple angles including from below and above or all angles sufficient to obtain views of all sides of an item with a single placement of an item into an onboarding system in a single pose.

For at least the limitations described above there is a need for a rapid onboarding system for visual item classification from multiple angles.

BRIEF SUMMARY OF THE INVENTION

One or more embodiments described in the specification are related to rapid onboarding system for visual item classification from multiple angles. An item classifier, which inputs an image and outputs the identify of an item in the image, is trained with a training dataset that is based on images captured and processed by the rapid onboarding system. The system may capture multiple images of each item from different angles, with different backgrounds, as provided by a monitor screen positioned in the background of the images, and under different lighting conditions to form a robust training dataset.

One or more embodiments of the system may include an item imaging system and an item classifier training system. Each of the items that are to be classified (for example, products in an autonomous store) is placed into the item imaging system. An item identification input, such as a barcode scanner or a camera that captures a barcode image, may obtain the item's identifier. The imaging system may contain multiple cameras in different positions that capture images of the item from different angles. Embodiments utilize one or more monitor screens that display various background colors in the captured images. This enables capturing multiple images rapidly with different backgrounds, i.e., without moving the item and placing it on a different background. For example, the background colors may include at least two colors with different hues that are utilized when capturing different images in rapid fashion. Specifically, a controller of the item imaging system transmits commands to the monitors to successively display different background colors, and commands the cameras to capture images with these background colors. The captured images and the item identifier are transmitted to the item classifier training system. The training system may generate a training dataset based on the images, where each training image is labeled with the item identifier. The training system then trains an item classifier with the training dataset.

A monitor screen may for example be at or near the bottom of the item imaging system, and the item may be placed onto the monitor screen for image capture. In one or more embodiments, the item imaging system may have a transparent platform onto which the item is placed for image capture, and cameras may be oriented to capture images of both the top side and bottom side of the item, again, without moving the object.

In one or more embodiments, the imaging system may have at least two cameras that are separated horizontally by at least 30 centimeters.

One or more embodiments may have an operator terminal linked to the controller; the terminal may display instructions to place each item into one or more orientations.

In one or more embodiments, the imaging system may also have controllable lights that may output multiple lighting conditions. The lights may be controlled by the system controller, which transmits lighting commands to successively output each lighting condition. An illustrative lighting condition may have some of the lights on and others off. Other embodiments may alter the color or diffusion characteristics of the lights.

The controller may command the monitor screen or screens to output a sequence of background colors, and command the cameras to capture a set of first images with each background color. Then it may command the lights to output a sequence of lighting conditions, and command the cameras to capture a set of second images with each lighting condition. The two sets of images may then be processed to generate training images for each item.

An illustrative process to generate training images first extracts an item mask from the set of first images (with different background colors), and then applies this mask to the set of second images (with different lighting conditions) to separate the item (in the foreground) from the background. Mask extraction may for example use a difference of the hue channels of two (or more) images with different background colors; the item mask may be based on a region in the hue difference with values below a threshold value. The item foreground images from the set of second images may then be modified using various transformations to form the training images for the item. Illustrative modifications may include for example scaling, rotation, color changes, adding occlusions, and placing the item into different backgrounds.

In one or more embodiments, the visual item classifier may have two stages: an initial feature extraction stage that maps images into feature vectors, and a classification stage that maps feature vectors into item identities. The training dataset may be used to train only the classification stage; the feature extraction stage may be a fixed mapping, for example based on a publicly available image recognition network.

In one or more embodiments the rapid onboarding system may be configured to capture images of an item from multiple angles, including for example views of each point of the external surface of the item. The system may have a platform onto which an item is placed, and the platform may be controllable to be either transparent or non-transparent (for example, opaque or translucent). Cameras below the platform may capture images of the bottom side of the item when the platform is made transparent.

In one or more embodiments, variable color backgrounds for item images may be generated using any type of background, including but not limited to monitor screens. For example, in one or more embodiments backgrounds may include translucent panels with controllable, variable color lights behind the translucent panels. The lights may be coupled to one or more controllers that command the lights to generate the desired background colors. One or more embodiments may also have controllable lights below the platform, and these lights may be used to set the color of the platform when the platform is made translucent.

The platform onto which items are placed may include an electrochromic material, and this material may be coupled to one or more controllers that set the transparency of the material. In one or more embodiments, one or more of the translucent panels may also include an electrochromic material, and these panels may be switchable between transparent and non-transparent states.

In one or more embodiments the top view cameras of the system may be located along or near the top edges of the walls of the enclosure into which items are placed for imaging. For example, without limitation, there may be one or more, 2 or more, 4 or more, or any desired number of cameras along the top edge of each wall. There may also be one or more, 2 or more, 4 or more, or any desired number of cameras below the platform that are oriented to view the bottom side of the item when the platform is made transparent.

One or more embodiments may also have other sensors such as a weight sensor that measures the weight of the item that is placed on the platform.

One or more embodiments may include an image processor that calculates a 3D model of the item from the images captured by the cameras. The processor may calculate the item's shape, size, or volume from the 3D model.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein:

FIGS. 13A, 13B, and 13C show side cross-section, top, and perspective views, respectively, of the rapid onboarding system of FIGS. 9 and 10.

DETAILED DESCRIPTION OF THE INVENTION

A rapid onboarding system for visual item classification from multiple angles will now be described. Embodiments of the system may for example enable rapid and efficient "onboarding" of an automated store by capturing and processing images of items in the store's inventory in order to train an item classifier that is used to identify items taken by shoppers. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
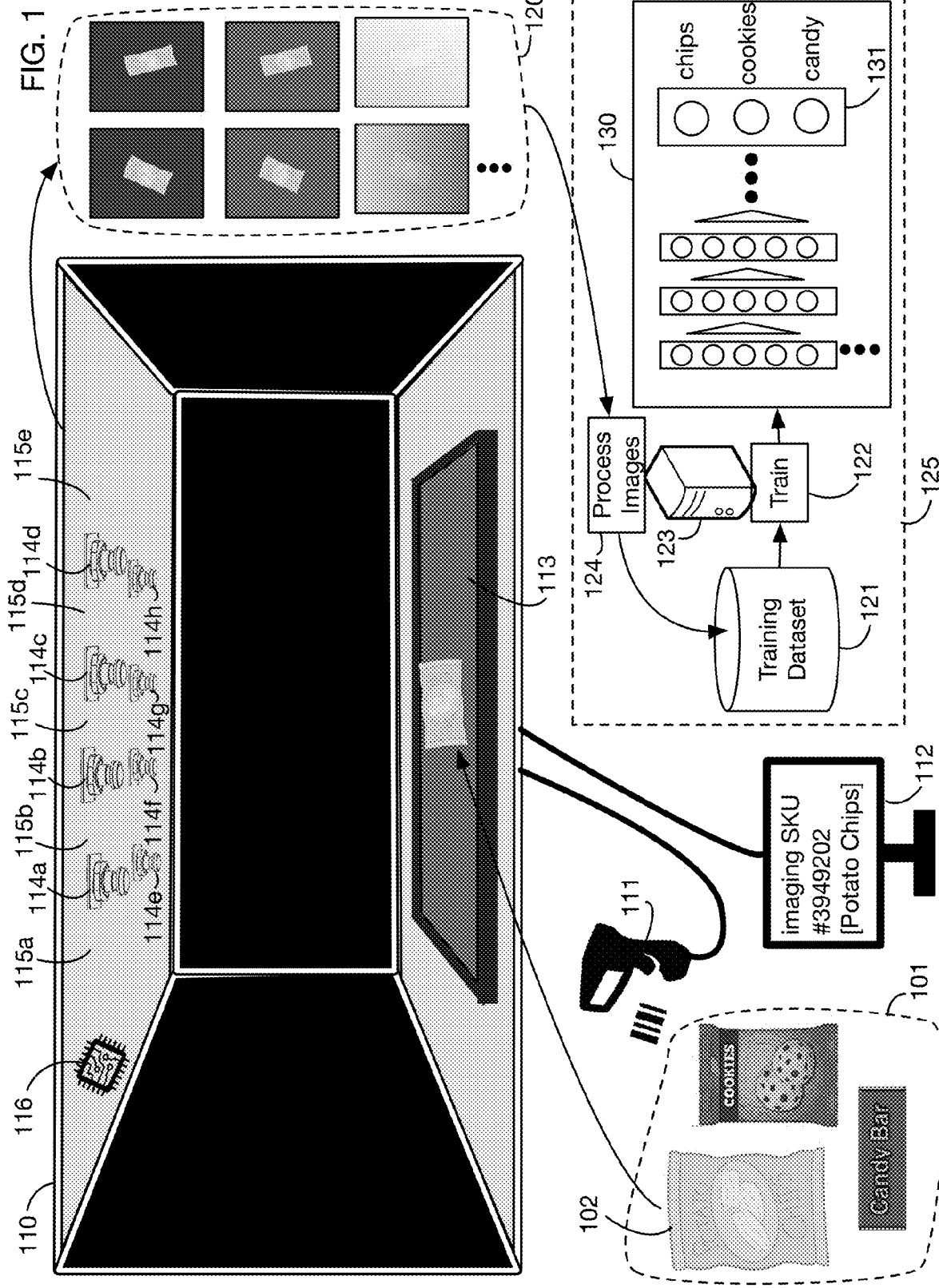
FIG. 1 shows components of an illustrative rapid onboarding system that has a monitor screen onto which a product is placed for imaging, and multiple lights and cameras to capture images from different positions and under different conditions.

FIG. 1 shows an illustrative embodiment of the invention that may be used to capture and process images of three illustrative items 101, which may be offered for sale in an autonomous store. Stores may have thousands of items in their product catalogs, and representative images of every item must be captured to onboard a store for autonomous operation. Multiple images of each item may be needed for example to train a visual item classifier 130 that identifies items selected by shoppers when the store is in operation. Embodiments of the invention may greatly reduce the amount of time needed to capture these images. Each item may be placed successively into the image capture system 110, which controls the imaging environment and manages the image capturing process. In the example of FIG. 1, an operator places item 102 into the system 110. In one or more embodiments, movement of items successively into image capture system 110 may be automated or semi-automated; for example, items may be placed onto a conveyor belt or a rotating platform that moves items into and out of the system 110, or a robotic system may successively transport items into and out of the system.

Item 102 is placed into imaging system 110 onto a monitor screen 113. A monitor screen may be any device or devices that can generate a background of different colors or patterns. The image capture system 110 may vary the background colors or patterns of screen 113 to facilitate processing of item images, as described below. The monitor screen 113 may be for example, without limitation, a standard computer monitor screen, a television, a projector screen, or an array of LEDs of different colors, wavelengths, or intensities. In the embodiment of FIG. 1, a single monitor screen 113 is placed on the bottom surface of imaging system 110, and the item 102 is placed directly on top of this screen. One or more embodiments may place monitor screens in other locations within imaging system 110, and may place items onto other surfaces rather than directly onto the screen; an illustrative example is described below with respect to FIG. 4.

Before or after item 102 is placed into imaging system 110, the identity of the item is recorded using an item identification input device 111. This input device 111 may be for example a barcode reader that scans a barcode printed on or attached to the item. Device 111 may be a camera that captures an image of the item that includes an image of a barcode or other identifying mark or text; in particular it may be identical to one of the other imaging cameras in the system 110 described below. Device 111 may be a user interface such as a touchscreen, keyboard, terminal, microphone, or other device that a user may use to directly input an item identifier. One or more embodiments of the imaging system 110 may include an attached operator terminal 112, which may in some cases also be the item identification input device 111. The operator terminal may provide information and instructions to an operator to guide the process of placing items into the imaging system 110.

In addition to the monitor screen or screens 113, imaging system 110 may contain cameras and lights. The lights may for example be controllable to provide variable illumination conditions. Item images may be captured under different lighting conditions in order to make the training of the item classifier 130 more robust so that it works in the potentially varying conditions of an operating store. Illustrative lights 115a through 115e are shown mounted at different positions on the lower surface of the ceiling of imaging system 110. One or more embodiments may have any number of lights mounted in any positions and orientations. The lights 115a through 115e may support controllable variable illumination. Variations in illumination may consist of only on/off control, or in one or more embodiments the lights may be controllable for variable brightness, wavelengths, or colors. Variations in illumination may be discrete or continuous.

Imaging system 110 contains cameras 114a through 114h, which in this embodiment are oriented to point downwards at monitor screen 113. One or more embodiments may have any number of cameras mounted in any positions and orientations. Cameras may be in different positions in order to capture images of item 102 from different angles. For example, in an illustrative embodiment, cameras 114a and 114d may be separated by approximately 30 centimeters, and cameras 114a and 114e may be separated by approximately 5 centimeters. In one or more embodiments, cameras may be placed in positions that are similar to the positions of cameras in an operating store, for example on the underside of a shelf looking down on the shelf below, so that captured images reflect the possible images of items during store operations.

Imaging system 110 may contain or may be coupled to a controller 116, which may communicate with and control system components such as identification input device 111, operator terminal 112, monitor screen or screens 113, variable illumination lights 115a through 115e, and cameras 114a through 114h. This controller 116 may contain any type or types of processor, such as for example a microprocessor, microcontroller, or single board computer. In one or more embodiments the controller 116 may be a computer that is physically remote from but coupled to the physical imaging system 110. In one or more embodiments the operator terminal 112 may be a computer that also acts as controller 116. Controller 116 executes a sequence of operations, described below, to change the imaging environment and to capture images 120 of the item.

Images 120 of item 102 captured by cameras 114a through 114h are then used to train the visual item classifier 130 that may be used to recognize items from images captured during store operations. The classifier training system 125 may first process the item images 120 to generate training images of the item. Illustrative steps for image processing operation 124 are illustrated below with respect to FIGS. 6 and 7. Training images of all items 101 are labeled with the item identities as captured by input device 111. The labeled images are added to a training dataset 121. The training dataset is input into a training process 122 that trains the visual item classifier 130. Classifier 130 may for example accept as input an image of an item (as an array of pixel values), and may output a final layer 131 that identifies the item in the image. For example, output layer 131 may assign a probability to each item, and the identified item may be the item with the highest probability. Classifier 130 may be any type of classifier, including for example, without limitation, a neural network, a linear classifier, a support vector machine, or a decision tree. Any machine learning algorithm or algorithms may be used for training process 122.

Training system 125 may include a processor or processors 123, which may for example perform image processing operation 124 and training operation 122. In one or more embodiments, controller processor 116 and training system process 123 may be identical or may share components. Processor or processors 123 may for example include GPUs to parallelize image processing and training operations. In one or more embodiments, processor or processors 123 and training dataset 121 may be remote from item imaging system 110, and images 120 may be transferred over a network connection to the training system 125.

Figure 2:
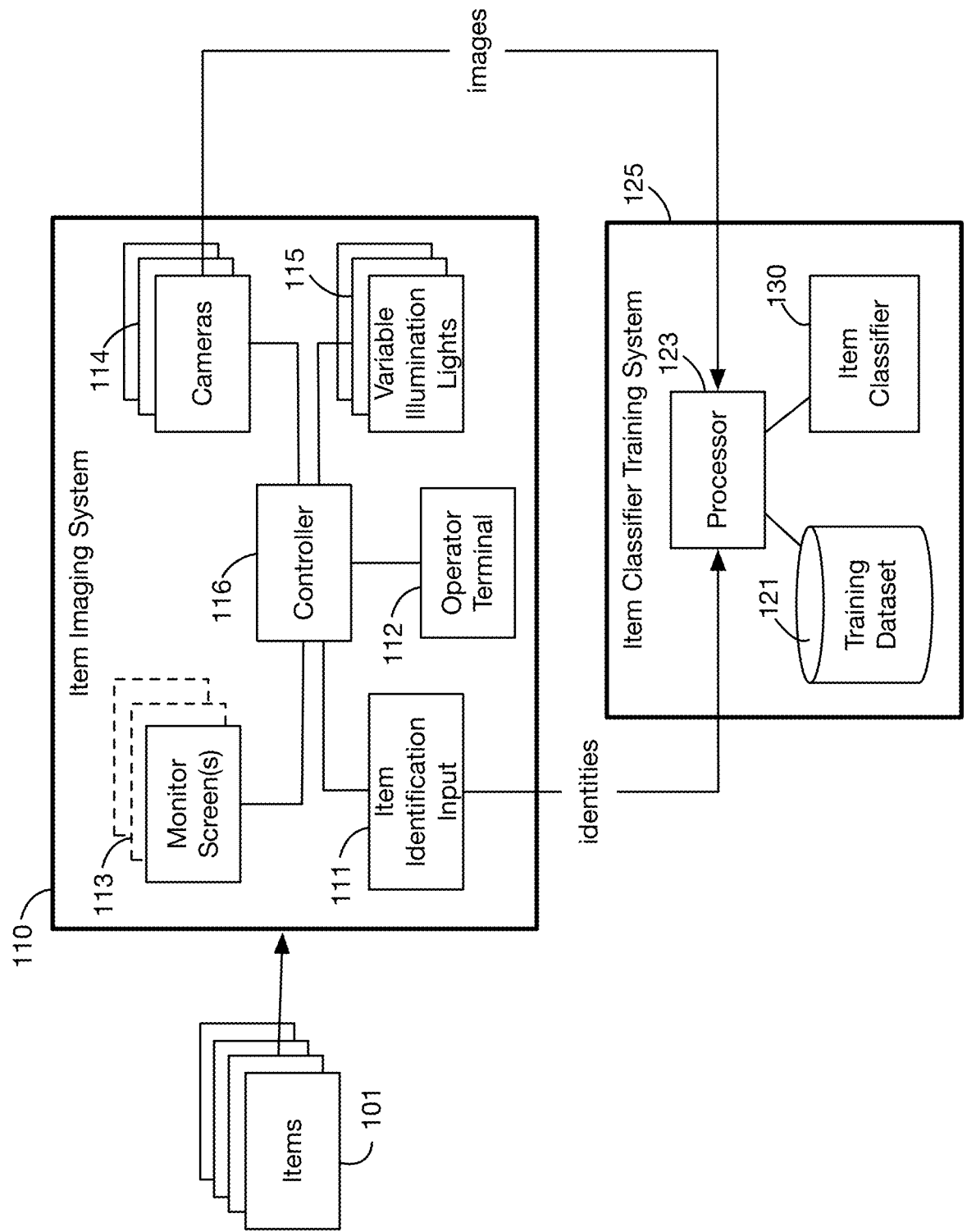
FIG. 2 shows an architectural block diagram of the embodiment of FIG. 1.

FIG. 2 shows an architectural block diagram of the embodiment of FIG. 1. The two major subsystems of the embodiment are item imaging system 110, and item classifier training system 125. Items 101 are placed into item imaging system 110; images and item identities are passed from the item imaging system to the item classifier training system. In item imaging system 110, controller 116 is coupled to and controls all other components, including monitor screen or screens 113, cameras 114, variable illumination lights 115, item identification input 111, and operator terminal 112. Item classifier training system 125 has a processor (or processors) 123, which is connected to training dataset 121 and to item classifier 130; processor 123 processes the images from cameras 114, builds the training dataset 121, and performs the training of the classifier 130. These components are illustrative; one or more embodiments may have different components, a subset of these components, or components organized with different connections.

Figure 3:
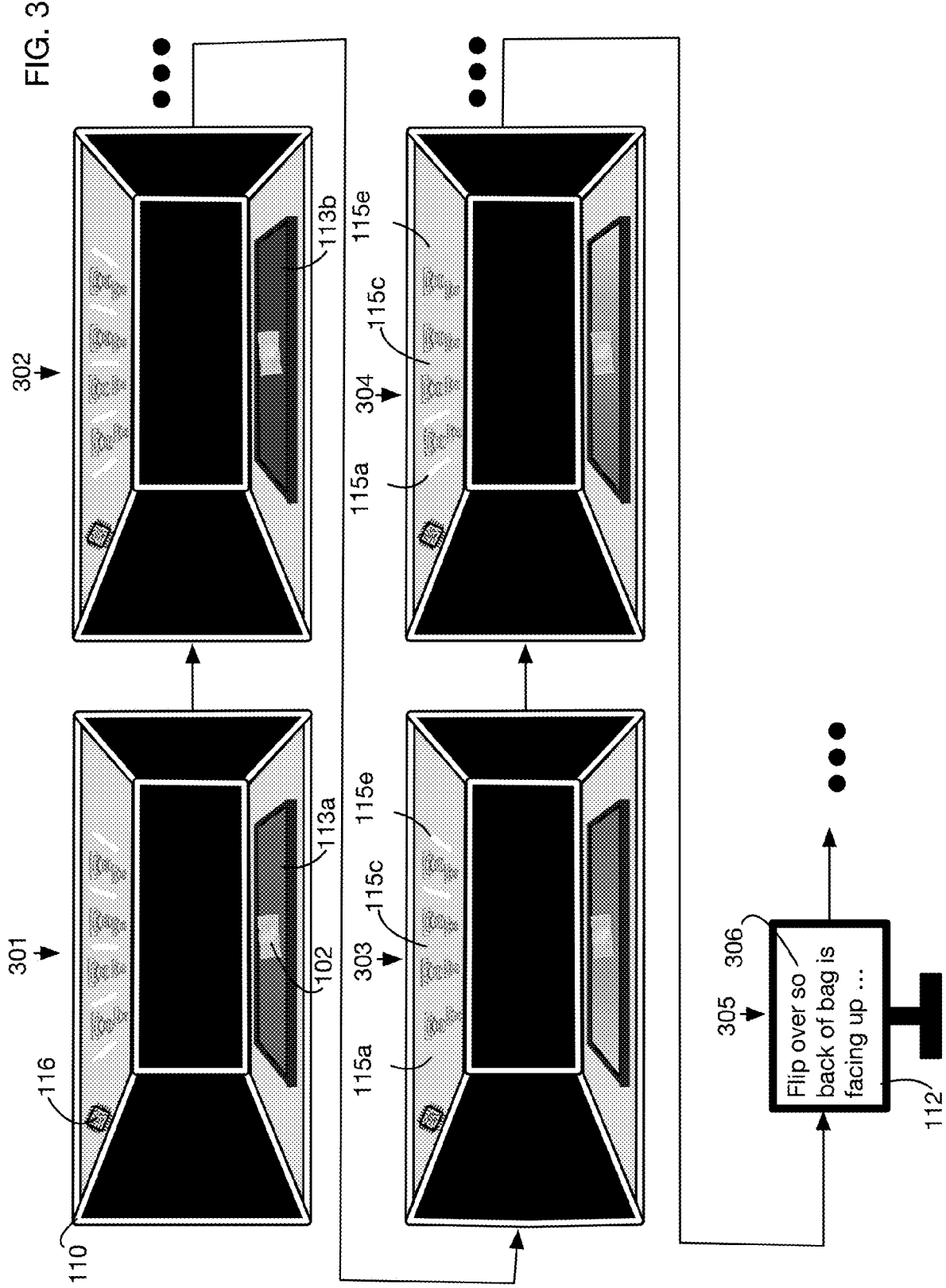
FIG. 3 shows an illustrative sequence of imaging steps employed by the system of FIG. 1: first the monitor background is set to different colors; then the variable illumination lights are set to different lighting conditions; and finally, the item is placed in a different orientation for additional imaging.

FIG. 3 shows an illustrative sequence of steps that may be performed by item imaging system 110 to capture images of item 102. After item 102 is placed onto the monitor screen, controller 116 first cycles the monitor screen through a sequence of background colors, and captures images with each background color. For example, in step 301, the monitor screen background 113a is set to red, and in step 302 the monitor screen background 113b is set to blue. As described below with respect to FIG. 6, modifying the background color (or pattern) allows the system to extract a high-quality mask of the item being imaged. Any number of background colors (or patterns) may be used. After the background sequence (steps 301, 302, and similar steps for other backgrounds), controller 116 then cycles the lights through a sequence of lighting conditions, and captures images with each lighting condition. For example, in step 303, left light 115a is set to high intensity, middle light 115c is dimmed to low intensity, and right light 115e is off; then in step 304, left light 115a is off, middle light 115c is at low intensity, and right light 115e is set to high intensity. Any number of lighting conditions may be used, and each may correspond to any settings of the various lights in the imaging system 110. Finally, after cycling through background colors and lighting conditions (and capturing images for each), in step 305, operator terminal 112 displays message 306 that prompts the operator to put item 102 into a different orientation; the image capture sequences may then be performed again for the new item orientation. An illustrative series of prompts for an item with a shape that is roughly a rectangular parallelepiped may be for example to rotate the item along its long axis so that the upward facing surface of the item is the top, right side, bottom, and left side, and to then rotate the item so that the front end and then back end are facing upward (6 orientations in total). In one or more embodiments, analysis of the images already captured of an item may be used to determine what additional orientations, if any, need to be captured, and prompt or prompts 306 may be set accordingly. Special instructions may also be provided in some situations for how to arrange an item in different configurations for imaging. For example, some product packaging has a flexible protrusion that can be folded over in different orientations, and the appearance of the product may differ depending on how the protrusion is folded; terminal 112 may then instruct the operator to change the fold orientation to capture images in all configurations. Operator terminal 112 may not be needed in some environments, for example if it is obvious which orientations each item should be placed into, or if (as illustrated below) the system is able to capture images of an item from multiple orientations simultaneously.

Figure 4:
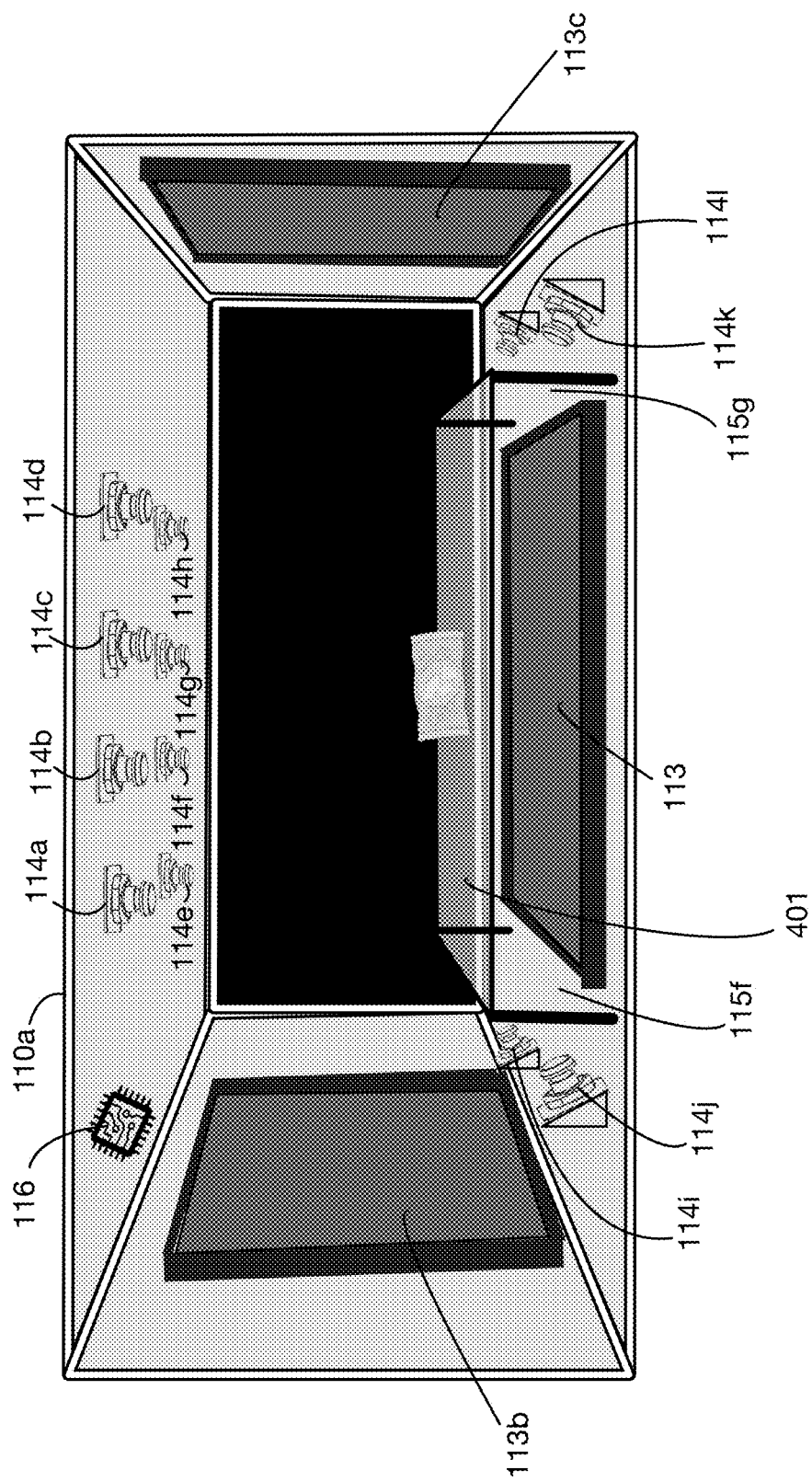
FIG. 4 shows a variation of the embodiment of FIG. 1 with multiple monitor screens on different internal faces of the imaging system, and a transparent pedestal onto which an item is placed for imaging.

FIG. 4 shows a variation 110a of the item imaging system 110 of FIG. 1. In this embodiment, images of both the top and bottom sides of an item may be captured simultaneously. Instead of being placed directly onto a monitor surface, items are placed on a transparent pedestal or platform 401 that fits over the bottom monitor 113. Cameras 114a through 114h are located above the surface of platform 401 and look down at the top side of the item. Additional cameras 114i, 114j, 114k, and 114l are located on the bottom surface of the imaging system, below the surface of platform 401, pointing upwards at the bottom side of the item. Lights 115f and 115g are located on the bottom surface of the imaging system to illuminate the bottom side of the item. Additional monitor screens 113b and 113c are located on the sides of the imaging system, to form controllable backgrounds for the images from cameras 114i through 114l. As in FIG. 1, all components are connected to and controlled by controller 116.

The configuration shown in FIG. 4 is illustrative; one or more embodiments may place monitor screens, cameras, and lights in any locations and orientations, to support image capture from any angles under any desired background and lighting conditions. In one or more embodiments, the transparent platform 401 may be a one-way mirror so that cameras may be placed directly underneath the platform without interfering with images captured from the cameras above the item.

Figure 5:
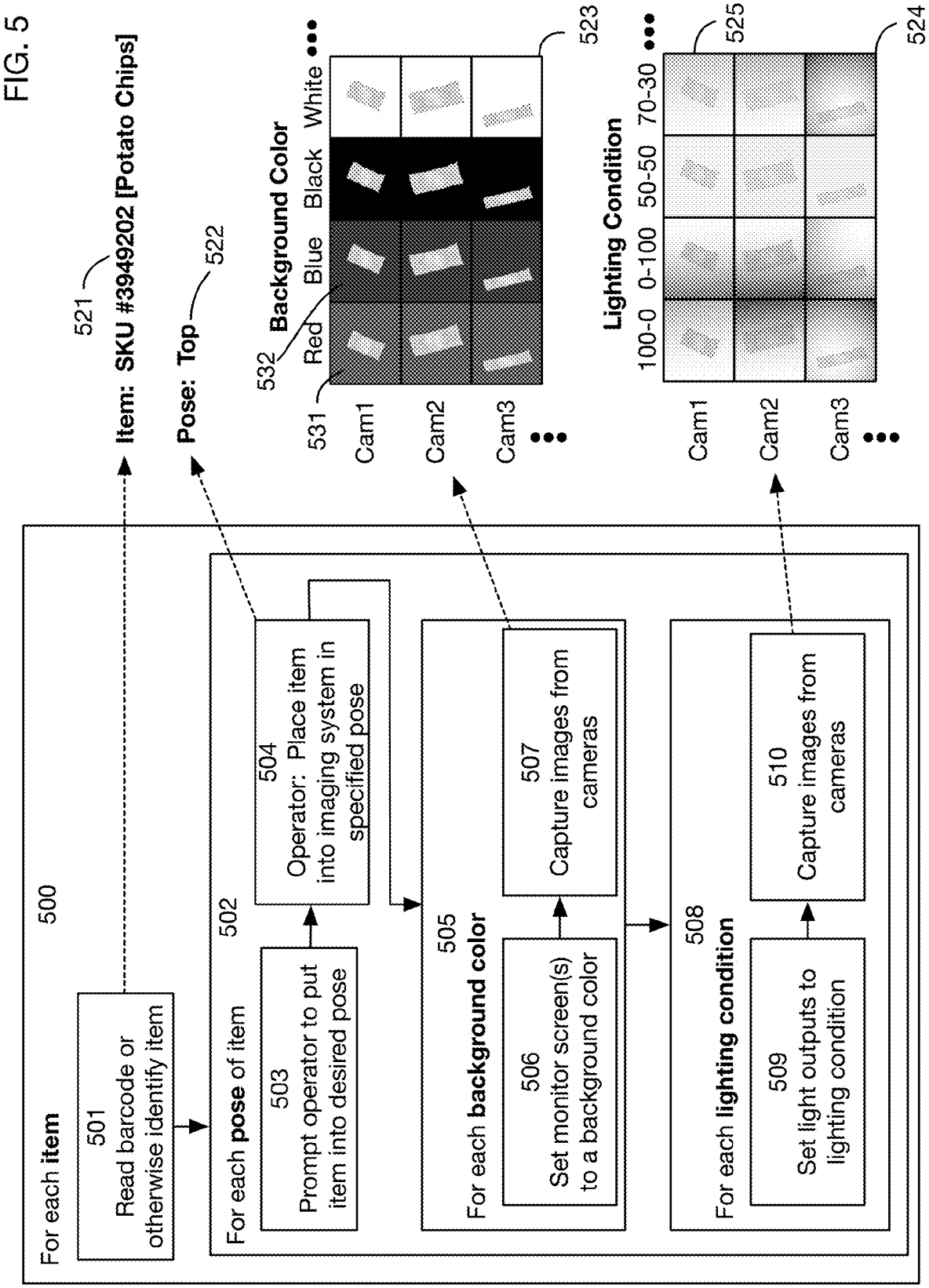
FIG. 5 shows an illustrative flowchart of steps to capture images from the imaging system.

FIG. 5 shows a flowchart of illustrative steps performed by one or more embodiments of the invention to capture item images under different orientations and conditions. Outer loop 500 is repeated for each item that needs to be recognized by the item classifier (for example, for all items in a store's catalog or inventory). In step 501, an item barcode or other identifier is read, for example by a barcode scanner or camera, which obtains the item identifier 521 (such as a SKU). Then loop 502 is repeated for each different pose into which the item must be placed for imaging. A prompt 503 may be generated to instruct the operator to place the item into the desired pose; the operator may perform step 504 to put the item into the imaging system in this pose 522. Two inner loops are 505 and 508 are then performed to cycle through background colors and lighting conditions, respectively. In inner loop 505, step 506 sets the monitor screen or screens to the desired background color, and step 507 captures images from the cameras with this background. Images captured in this loop 505 may be represented for example as table 523, which has an image for each combination of camera and background color. Illustrative table 523 has images for four different background colors: red, blue, black, and white. One or more embodiments may use any set of any number of background colors, including for example colors of different hues (such as red and blue). Illustrative image 531 is an image from a first camera with a red monitor background, and image 532 is an image from the same camera with a blue monitor background. In inner loop 508, set 509 sets the lights to the desired lighting condition (which may set different lights to different outputs), and step 510 captures images from the cameras with this lighting condition. Images captured in this loop 508 may be represented for example as table 524, which has an image for each combination of camera and lighting condition. For example, row 525 in table 524 contains the images captured from the first camera under the various lighting conditions. The monitor screen background color may be set for example to a neutral color (or turned off entirely) for inner loop 508. In illustrative table 524, lighting conditions are represented by an intensity of "left" lights and "right" lights; in one or more embodiments any combination of light intensities and colors for the entire set of lights may represent a distinct lighting condition.

Figure 6:
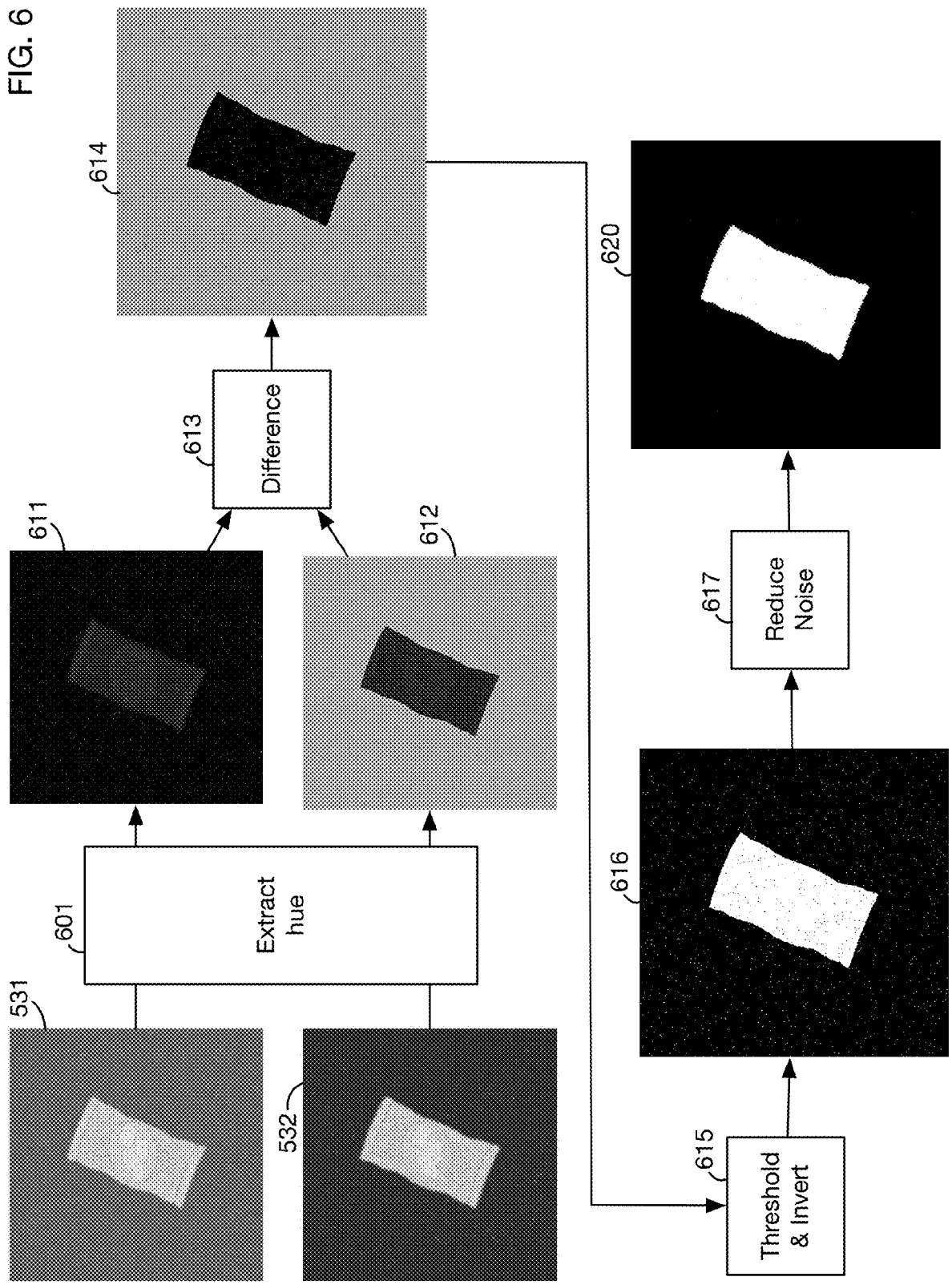
FIG. 6 shows an initial processing step that may be employed on the images captured by the imaging system, which extracts a binary mask of the item for each camera view.
Figure 7:
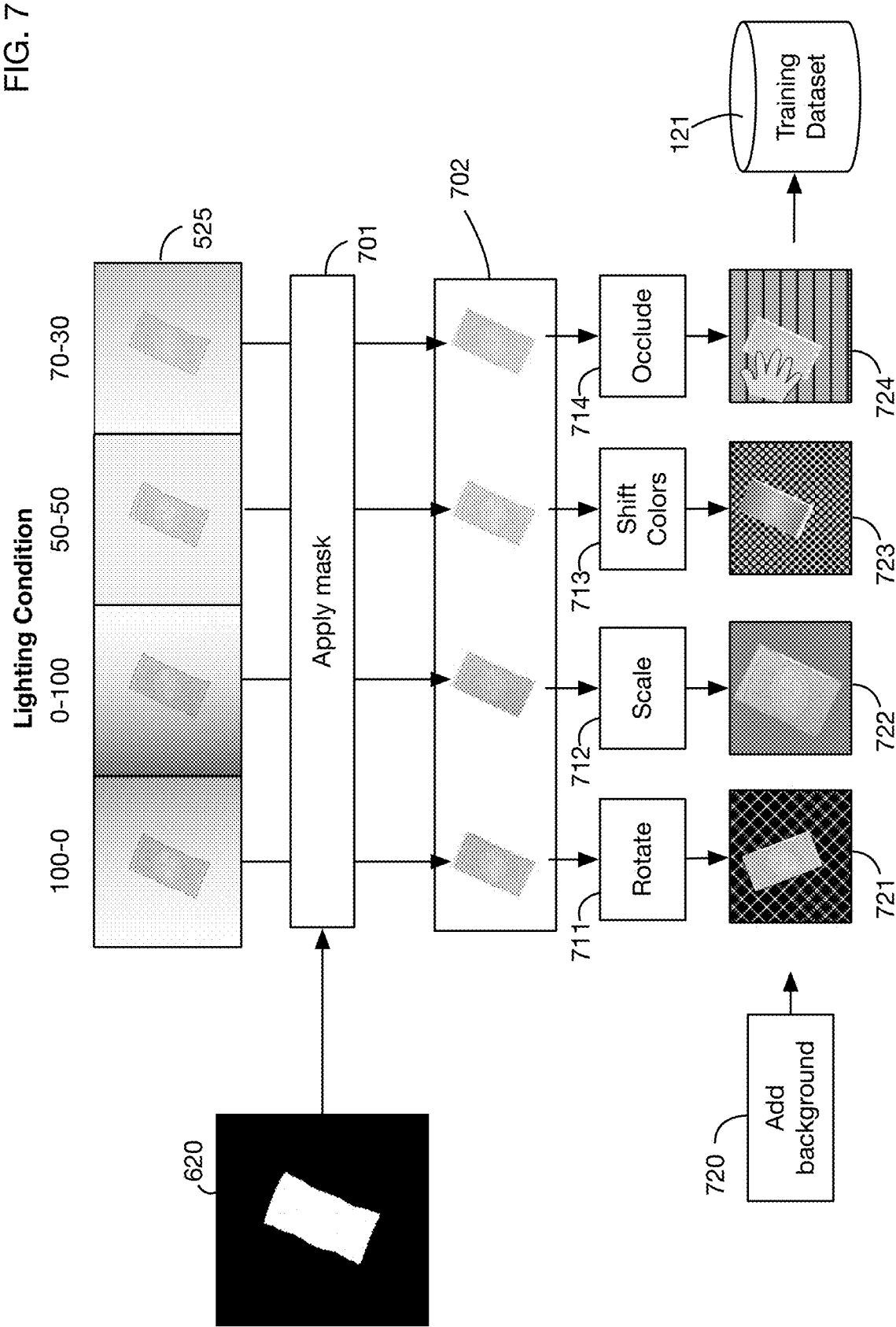
FIG. 7 shows another illustrative processing step that uses the mask from FIG. 6 to extract products from the background, and then generates synthetic images with modifications for the training dataset.

FIGS. 6 and 7 show illustrative steps to implement image processing step 124 that transforms images 523 and 524 into training data for the item classifier. These steps may be performed automatically by one or both of the imaging system controller or by the processor or processors of the training system. An initial processing step, illustrated in FIG. 6, may generate a mask of the item that may be used to separate the item image from the background. Variation of monitor screen background colors (in loop 505 of FIG. 5) facilitates this mask extraction step, since the item in the foreground can be identified as the portion of an image that does not change dramatically when the background color changes. An item mask may be generated for each camera. For example, in FIG. 6, images 531 and 532 corresponding to a first camera with red and blue backgrounds, respectively, may be processed to generate item foreground mask 620. (For simplicity, this process is illustrated using only two images; one or more embodiments may use any number of images with different background colors to calculate an item mask for a camera). In the embodiment shown in FIG. 6, the mask is extracted by locating image areas where the hue of the image remains relatively fixed when the background color changes. Step 601 extracts the hue channel (for example in an HSV color space) from images 531 and 532, yielding images 611 and 612, respectively. Hues are shown as greyscale images, with the red background hue in image 531 corresponding to black (hue of 0), and the blue background hue in image 532 corresponding to a light grey (hue of 240). Differencing operation 613 on the hue channels 611 and 612 results in difference 614; the central black zone shows that the hue of the item foreground is very similar between images 531 and 532. Operation 615 then thresholds difference 614 (converting it to a binary image) and inverts the result, yielding binary image 616. Noise in this image is reduced in step 617 (for example using morphological operators or other filters), resulting in final item mask 620.

The item foreground mask 620 (for each camera) may then be applied to the images 524 captured for each combination of camera and lighting condition. This process is illustrated in FIG. 7 for images 525 from the first camera. In step 701, mask 620 is applied to the images 525, yielding images 702 of the item alone (without a background). In one or more embodiments, these extracted item images 702 may be modified in various ways to generate training images that are added to training dataset 121. For example, any data augmentation techniques commonly applied to image data for machine learning may be applied to images 702. FIG. 7 shows illustrative examples of image rotation 711, scaling 712, color shifting 713, and adding occlusions 714. A background addition step 720 may then be applied to the transformed item foreground images, yielding for example images 721, 722, 723, and 724 that may be added to the training dataset 121 (labeled with the item identifier). Backgrounds may be selected randomly, or they may be selected to match possible backgrounds expected during store operations, such as patterns on store shelves or other items that may be placed on the same shelf.

Figure 8:
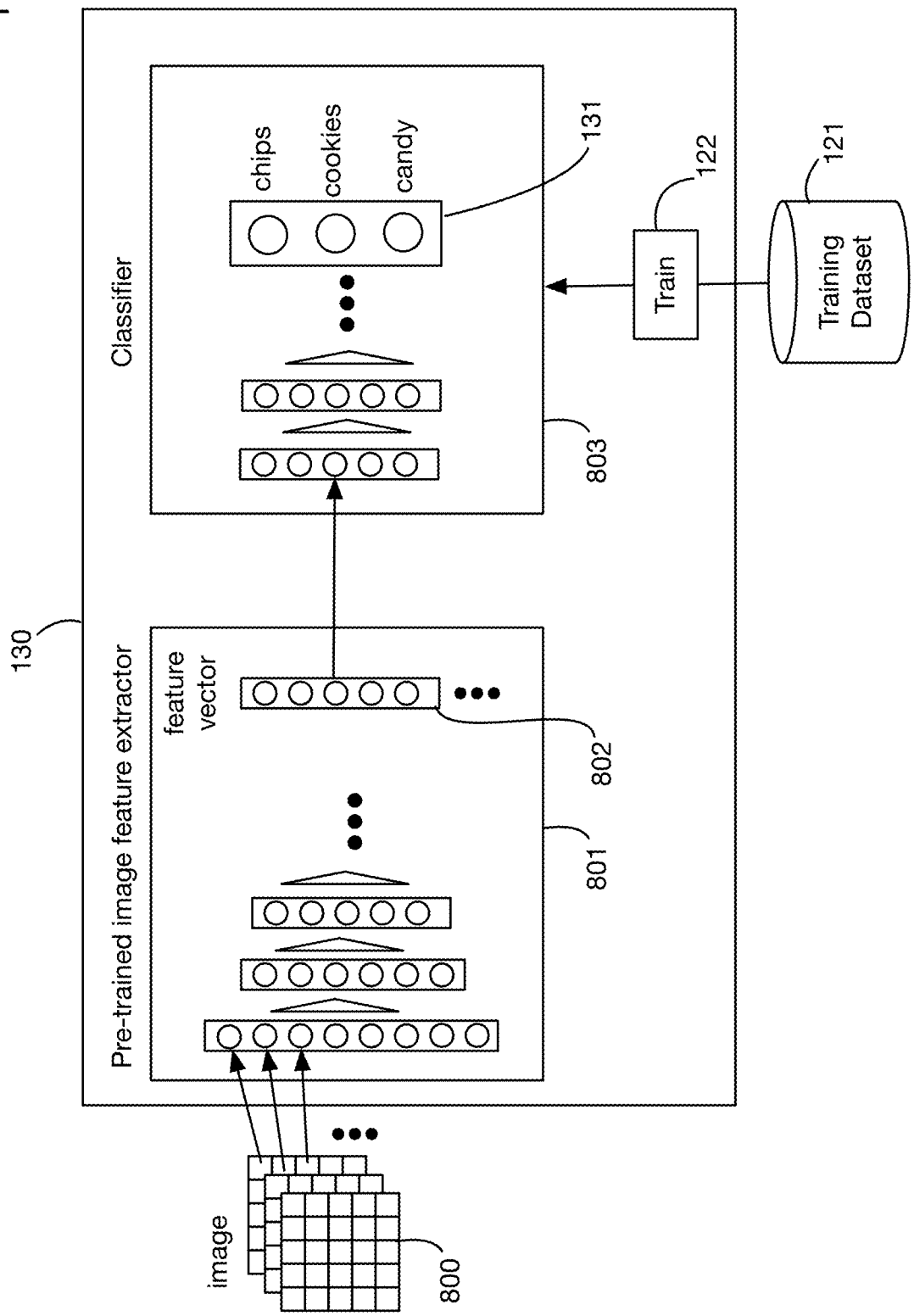
FIG. 8 shows a machine learning architecture that may be used in one or more embodiments, with a pre-trained feature extraction layer feeding a classifier layer that is trained on the training dataset of images generated from the item images captured by the imaging system.

Training dataset 121 containing labeled item images (transformed for example as shown in FIG. 6) may then be used to train the visual item classifier. One or more embodiments may use any type or types of classifier and any type or types of machine learning algorithms to train the classifier. FIG. 8 shows an illustrative architecture that may be used in one or more embodiments. The visual item classification system 130 may be structured in two stages: an initial feature extractor phase 801 that maps images 800 (as pixel arrays) into feature vectors 802, and a classifier phase 803 that classifies images based on the feature vector 802 generated by the first phase 801. The feature extractor 801 may be for example any module that maps image pixels into a feature vector; examples include, without limitation, a neural network, a convolutional neural network, a color histogram vector, a histogram of oriented gradients, a bag of visual words histogram constructed from SURF or other traditional computer vision features, or a concatenation of any of the above. The classifier 803 may be for example, without limitation, a K-nearest neighbor classifier, logistic regression, a support vector machine, a random forest classifier, Adaboosted decision trees, and a neural network which may be for example fully connected.

In one or more embodiments, the feature extractor phase 801 may be pre-trained (for example on a standardized bank of labeled images such as the ImageNet database), and training step 122 on the store's items may be applied only to the classification phase 802. A potential benefit of this approach is that training 122 may be considerably faster, and may require lower computational resources. Another benefit is that retraining may be faster when a store's product catalog is changed, since the feature extractor may not need to change. Feature extractor 801 may be based for example on publicly available image recognition networks such as ResNet or Inception. In one or more embodiments, feature extractor 801 may also be trained on the training dataset 121 if time and resources permit, which may in some situations improve classification accuracy.

One or more embodiments may employ variations of the rapid onboarding system illustrated for example in FIG. 1 and FIG. 4. In particular, in one or more embodiments variably colored backgrounds may be provided using translucent panels illuminated from behind the panels with variably colored light, instead of (or in addition to) using monitor screens. In some situations these translucent panels may be more robust or less expensive than monitor screens. One or more embodiments may use backgrounds with any combination of monitor screens and translucent panels illuminated from behind with variably colored light. In addition, in one or more embodiments, cameras may be oriented to view items from the top edges of a box into which the item is placed, which may allow the top of the box to be open so that items can be inserted and removed. Putting top cameras along the edges of the box also may allow imaging of items from below, for example through an electrochromic platform that can be made either transparent or translucent, since the top cameras on the edges may be out of the way of the background for views from cameras below the platform. In one or more embodiments, combinations of these features may enable capturing images of an item from multiple angles without requiring that the item be moved or reoriented. It may be possible for example to obtain images with views of all points on the external surface of the item with a single placement of the item into the onboarding system. Obtaining views of an item from multiple angles quickly (without requiring an operator to move or reorient the item) may improve the efficiency of the onboarding process.

Figure 9:
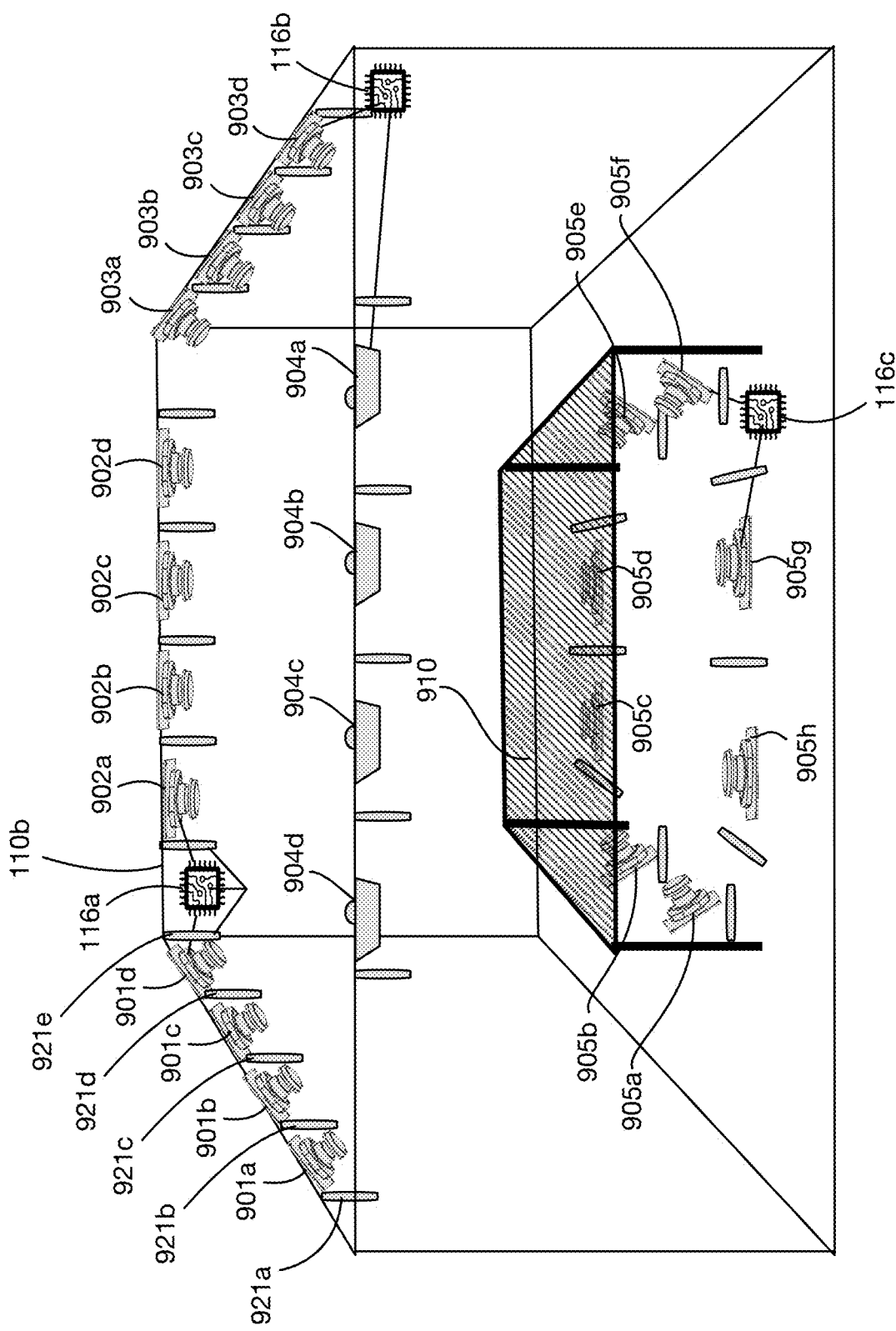
FIG. 9 shows a variation of a rapid onboarding system with cameras and lights located along the upper edges of the walls of the box, angled downward, and with additional cameras and lights located below an electrochromic platform onto which an item is placed for imaging.
Figure 10:
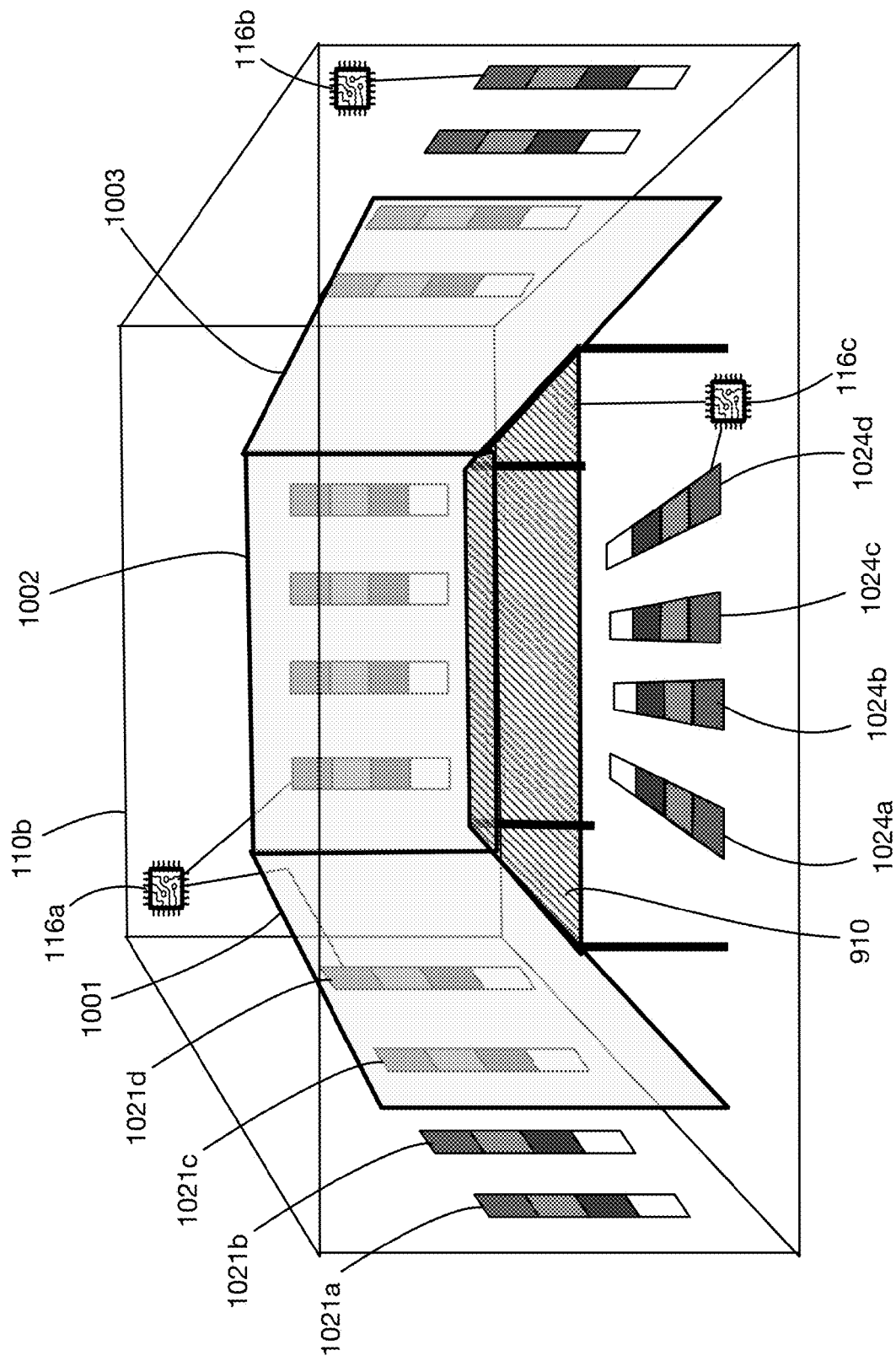
FIG. 10 shows additional details for the illustrative embodiment of FIG. 9, including multi-color LED strips and translucent panels that provide variable color backgrounds for images.

FIG. 9 and FIG. 10 show an illustrative embodiment of a rapid onboarding system that incorporates features described above. This system may for example support capture of images of an item from multiple angles (including from below) without requiring an operator to move or reorient the item, thereby improving the efficiency of the onboarding process. FIG. 9 illustrates the arrangement of cameras and foreground lights in the system, and FIG. 10 illustrates the background lighting elements. In this illustrative embodiment, the onboarding system includes a box with 16 cameras located around the upper top edges of the walls of the box. Foreground lights are interspersed among the cameras to illuminate the item to be imaged. Items may be placed into the box through the top, which may be open. The top may be covered by a canopy or roof, as described below. The item to be imaged may be placed on a platform 910, which may be made for example of a material that may be switched between a transparent state and a translucent or opaque state. For example, without limitation, platform 910 may be made from an electrochromic glass or plastic film, such as the type used in certain windows or meeting rooms when privacy is desired, without the loss of light. An illustrative material that may be used for this platform in one or more embodiments is for example iSwitchFilm™, described at https://www.smartglassla.com/pdlc-film/. This material is illustrative; any material or materials with variable or selectable transparency may be used in one or more embodiments for platform 910 or any portion thereof. When the platform 910 is made transparent, the bottom side of an item may be captured through the platform by cameras located below the platform. This feature allows all sides of an item to be imaged without requiring an operator to move or reorient the item.

In the embodiment shown in FIG. 9, the 16 top cameras are divided into 4 groups of 4 cameras along each edge: cameras 901a through 901d are on the left top edge; cameras 902a through 902d are on the back top edge; cameras 903a through 903d are along the right top edge; and cameras 904a through 904d are on the front top edge. This configuration is illustrative; one or more embodiments may use any number of cameras in any positions and orientations. For example, one or more embodiments may have two cameras on or near the top edge of each wall of the onboarding system, or on a subset of these walls. The top cameras may be angled downward to view an item on platform 910. In one or more embodiments this angled camera orientation may correspond for example to a typical or preferred orientation for cameras in a store that are viewing items on a shelf from the front of the shelf above. The embodiment of FIG. 9 also has 8 bottom cameras 905a through 905h, located below the platform 910. These bottom cameras may be used to image the bottom side of the item on the platform when the material of the platform is made transparent. One or more embodiments may use any number of bottom cameras; use of two or more bottom cameras may improve the ability to develop a 3D model of the item due to the stereo vision of the bottom cameras. Because the top cameras are located along the edges of the walls, rather than on the roof of the onboarding box (as shown for example in FIG. 1), the background color for the bottom camera images may be controlled, for example using a canopy or lid as described below.

In the embodiment shown in FIG. 9, all points on the external surface of an item placed onto platform 910 will be visible to at least one camera. (In most situations, all or most of these points may be visible from multiple cameras as well.) Thus the entire external surface of the item may be captured by the system with a single manual step by an operator of placing the item onto the platform in a single pose.

The embodiment shown in FIG. 9 also has foreground lights that illuminate the item placed on platform 910. These lights may be for example placed between or near cameras, or in any other locations. For example, lights 921a through 921e are located on the left side upper edge, interspersed among the left edge cameras 901a and 901d; similar lights are interspersed among the other cameras in other locations. This light arrangement is illustrative; one or more embodiments may use any number of lights in any locations. The lights may have variable output; for example they may be turned on or off to illuminate portions of the item, or their output may be modified in intensity or color.

As described above with respect to FIG. 1, the onboarding system may have one or more controllers that control the cameras, lights, or other components of the system to automate image capture. In the illustrative embodiment shown in FIG. 9, the system has three controllers 116a, 116b, and 116c; each of these controllers is coupled to 8 of the system's 24 cameras, and to the foreground lights located near those cameras. For example, controller 116a is coupled to cameras 901a through 901d and to cameras 902a through 902b, controller 116b is coupled to cameras 903a through 903d and to cameras 904a through 904d, and controller 116c is coupled to bottom cameras 905a through 905h. Controller 116a may also be coupled to light 921e (and to the other foreground lights on the left edge and back edge). This configuration may simplify system wiring and processing, since cameras are controlled in blocks of 8. The controllers 116a, 116b, and 116c may be coordinated for example by an external processor, or one of the three controllers may serve as a master controller and may transmit commands to the other two controllers. One or more embodiments may use any number of controllers and may assign system components to controllers in any desired manner.

FIG. 10 shows additional components of the illustrative embodiment of FIG. 9. The cameras are not shown in FIG. 10 for ease of illustration. As described with respect to FIG. 1, in one or more embodiments it may be desirable to control the background color of images, for example to facilitate masking the item image from the background. Instead of using monitor screens for background generation, as in FIG. 1, the embodiment in FIG. 10 uses translucent panels behind which variable color background lights are located. The color emitted from the background lights may be selected by the system controller or controllers. The translucent panels diffuse the light that passes through the panels, resulting in relatively uniform background colors that correspond to the selected light colors. Translucent panels may be placed on any face or faces of the onboarding system enclosure. They may be placed as well on a top face or canopy above the enclosure. FIG. 10 shows three translucent panels: panel 1001 along the left side, panel 1002 along the back side, and panel 1003 along the right side. There may be an additional panel along the front side, but this is not shown for simplicity of exposition. Illustrative materials that may be used for translucent panels in one or more embodiments include for example light diffusing acrylic sheets, such as those shown at https://www.curbellplastics.com/Shop-Materials/All-Materials/Acrylic/Acrylic-Sheet-Light-Diffusing#?Shape=CRBL_SkuSheet.

In one or more embodiments, some or all of the translucent panels may be made of an electrochromic (or similar) material, like the platform 910, and may be controllable to be either transparent or non-transparent. Cameras may be placed behind a controllable panel, and the controllable panel may be made transparent in order to capture images using cameras behind the panel, or made translucent when other cameras are used and the panel serves as background.

Variable color background lights may be placed behind the translucent panels. For example, these background lights may include LED light strips with multiple colors in the strips, such as RGB or RGBW LED strips. FIG. 10 shows illustrative background lights 1021a through 1021d along the left edge, behind translucent panel 1001. Each of these background lights is a bundle of 4 LEDs of colors red, green, blue, and white; this light configuration is illustrative and any desired type of background lights may be used in one or more embodiments. Similar background lights are placed behind back translucent panel 1002, behind right side translucent panel 1003, and potentially behind a front translucent panel (not shown). FIG. 10 shows only four background lights on each side for ease of illustration; in applications, light strips containing tens or hundreds of LEDs may be used.

The platform 910 may be made of a material that may be made transparent or translucent, as described above. Variable color background lights may be placed below the platform to illuminate the platform when it is put into a translucent state; for example, background lights 1024a through 1024d are below platform 910 in the embodiment shown in FIG. 10. In one or more embodiments, some or all of the foreground lights, such as those shown in FIG. 9, may also serve as background lights.

The individual background lights or light strips may be controlled by the controllers that also control the cameras. For example, background lights 1021a through 1021d may be controlled by controller 116a, and background lights 1024a through 1024d may be controlled by controller 116c. One or more embodiments may assign background lights to controllers in any desired manner. One or more embodiments may use separate controllers for cameras and for background lights.

Figure 11:
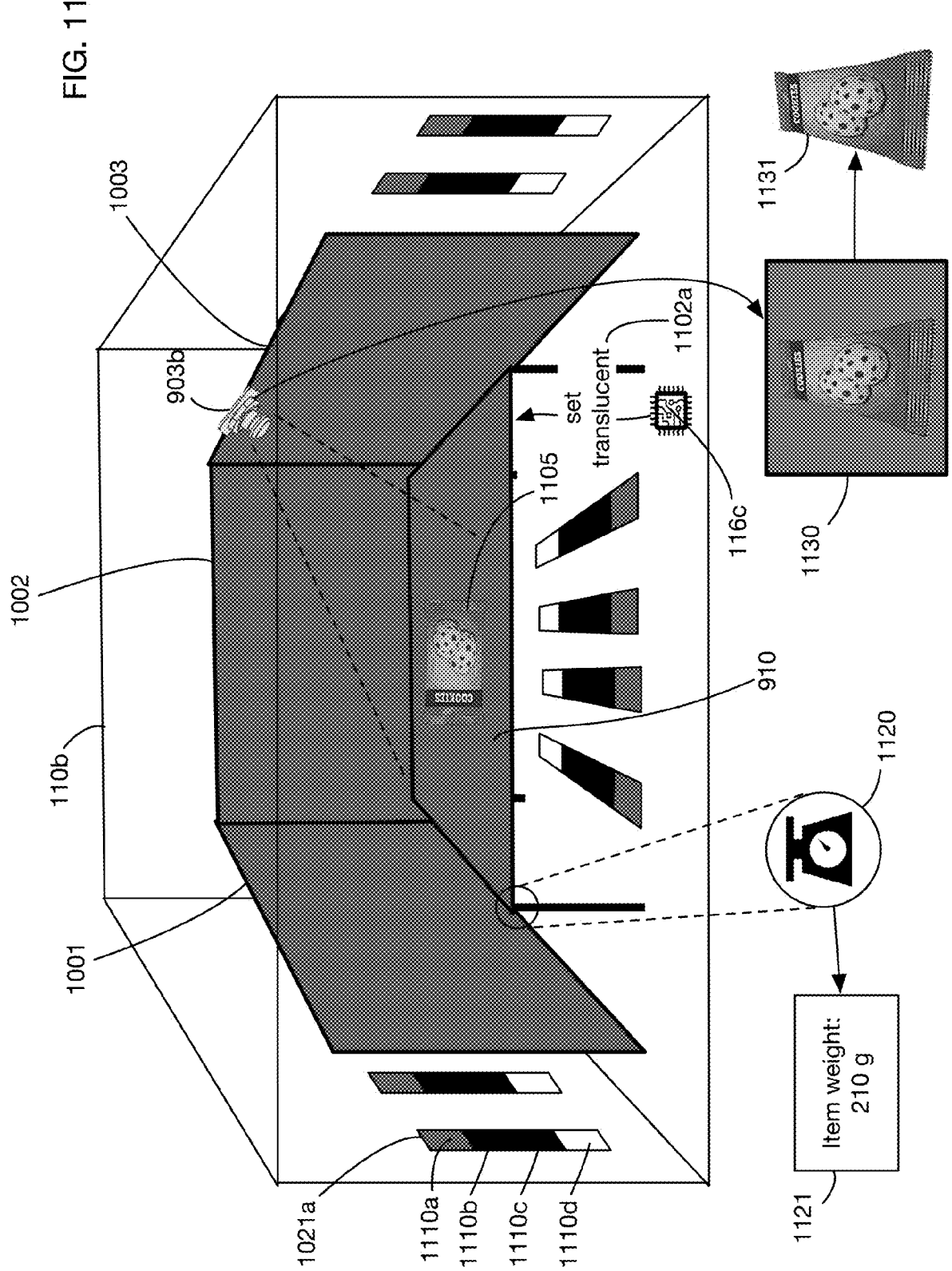
FIG. 11 shows an illustrative image capture step using the embodiment of FIG. 10, where lights are set to emit red color, which creates a red background on the translucent panels and on the electrochromic platform.
Figure 12:
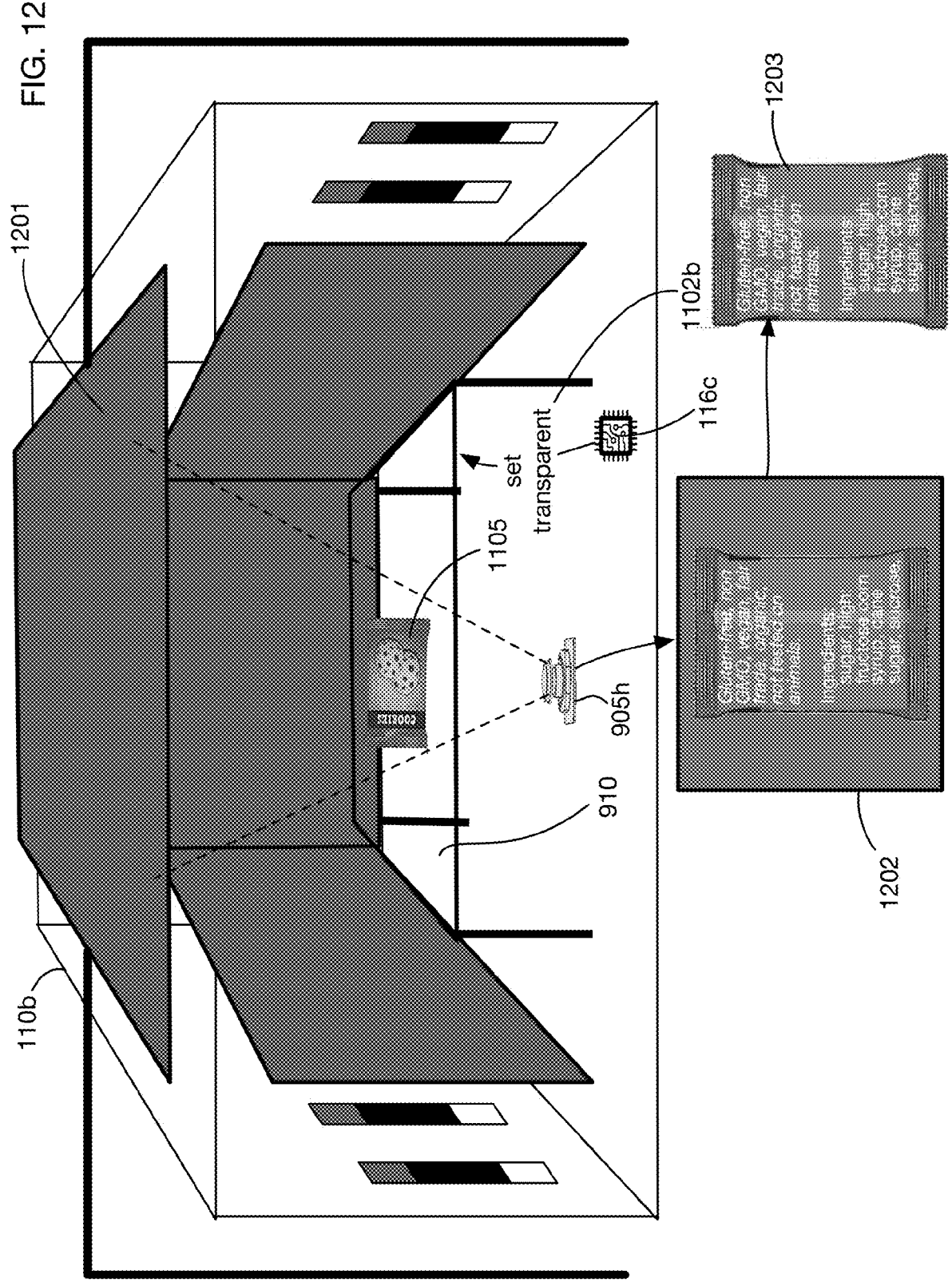
FIG. 12 continues the example of FIG. 11 to illustrate capturing images of the bottom of an item by setting the electrochromic platform to transparent, and capturing images from the bottom cameras below the platform.

FIGS. 11 and 12 show illustrative operation of the embodiment shown in FIGS. 9 and 10. For ease of illustration, most of the system's cameras and foreground lights are not shown. Item 1105 is placed onto platform 910. The controller or controllers of the system then execute a sequence of actions to set background light colors, turn on or off foreground lights or change their intensity, control transparency, and capture images. For example, in FIG. 11, background colors are initially set to red, for example activating red LEDs such as LED 1110a of background light 1021a, and by deactivating green and blue LEDs such as LEDs 1110b and 1110c of background light 1021a. If background lights contain a white LED such as LED 1110d, this LED may be activated or deactivated depending on the desired shade and intensity of the color. In FIG. 11, the system is first set to capture images from the cameras along the upper edges; therefore the platform 910 is set to a translucent state (non-transparent), for example via a command 1102a from controller 116c. The background lights below the platform are also set to emit red light. Camera images from the top cameras are captured with the red backgrounds. For example, camera 903b may capture image 1130 of the item 1105. Background colors may be changed and additional images may be captured, as described above. The images with backgrounds of various colors may then be processed to extract the item image 1131 from the background. In addition, in one or more embodiments the system may contain one or more additional sensors that capture other information about the item. For example, in the embodiment shown in FIG. 11, platform 910 may rest on one or more load cells, such as cell 1120, and may measure the weight 1121 of the item. This weight or other sensor data may be captured along with images during the onboarding process.

FIG. 12 continues the example of FIG. 11 to illustrate capture of images of the bottom side of the item. Platform 910 is set to a transparent state via command 1102b from controller 116c. This allows cameras below the platform, such as camera 905h, to view the item through the transparent platform. In this illustrative embodiment, a canopy or roof 1201 may also be included in the system to provide a background color for these images from the bottom cameras. The canopy may for example be suspended above the onboarding box so that the top of the box remains open for insertion and removal of items. One or more embodiments may use a roof or lid that may be opened to insert items and closed to capture images, instead of or in addition to a canopy suspended above the onboarding box. In one or more embodiments the canopy, roof, or equivalent component may include a translucent panel with variable color background lights behind the panel, as illustrated for example in FIG. 13A. In FIG. 12, the canopy 1201 is configured to have a red color (using for example red background light behind a translucent panel), and illustrative bottom camera 905h captures image 1202 of the bottom side of item 1105. The background color of the canopy 1201 may then be modified, and additional images of the bottom of the item may be captured by the bottom cameras. These images may then be processed to mask out the backgrounds, resulting in image 1203 of the bottom of the item 1105. In one or more embodiments, images captured through the transparent platform 910 may have imperfections if the platform is not perfectly transparent, or if for example it introduces distortions due to refraction or diffraction. Because the system may have multiple bottom cameras, the bottom images may be combined to reduce or eliminate these effects. For example, in one or more embodiments the effects may be minimized using a deconvolution denoising process, similar to procedures used in interferometry.

FIGS. 13A, 13B, and 13C show side, top, and perspective views, respectively, of a rapid onboarding system 110b similar to the system illustrated in FIGS. 9 through 12. The side cross-section view in FIG. 13A shows a canopy 1201, which includes a translucent panel 1305 with multi-color LED light strips 1311a through 1311f behind the panel to provide the desired background color. (A controller, not shown, may also be attached to the light strips to select the background light color.) For simplicity, foreground lights such as lights 921a through 921e of FIG. 9 are not shown. Similar LED strips are illustrated behind translucent left side panel 1001, behind translucent right panel 1003, and below electrochromic platform 910. (Note that for simplicity only a single "strip" of LEDs is shown in FIGS. 10 through 12 on each side of the enclosure and on the bottom; one or more embodiments may use multiple strips as shown in FIG. 13A, for example to increase the uniformity of the lighting diffused through the panels.) Illustrative top cameras 901c and 903c are angled downward at approximately 45 degrees to view item 1105 on platform 910. Top view 13B, shown without the canopy 1201, shows all 16 top cameras 901a through 901d, 902a through 902d, 903a through 903d, and 904a through 904d, along each of the 4 sides of the enclosure. Perspective view 13C (also shown without the canopy) also illustrates how the top cameras are angled downwards to view the item in the item 1105 on platform 910.

Figure 14:
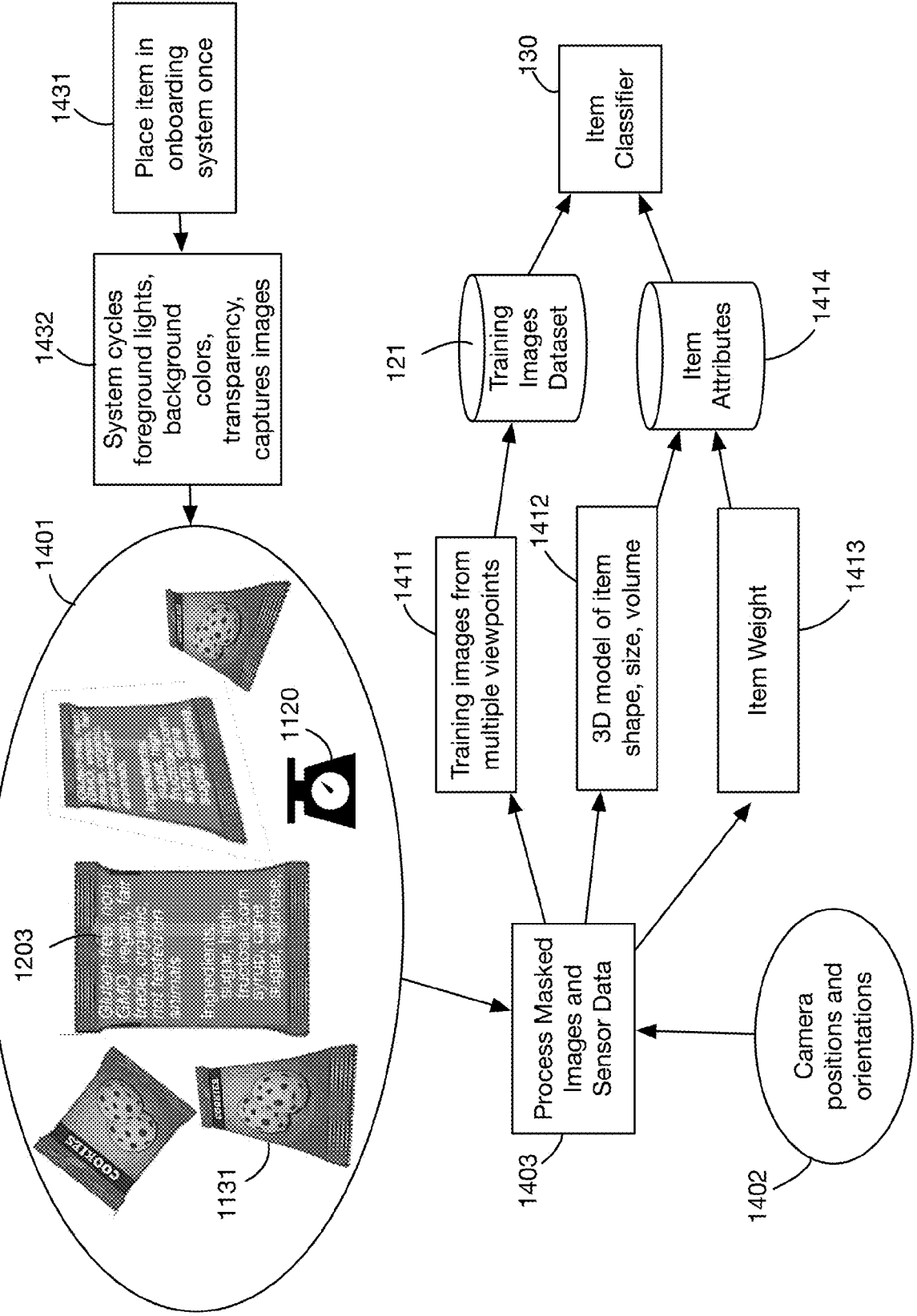
FIG. 14 shows illustrative processing steps for the images and sensor data captured from the rapid onboarding system shown in FIGS. 9 through 13C.

FIG. 14 shows an illustrative flowchart of steps that may be performed with a rapid onboarding system such as the embodiment shown in FIGS. 9 through 13C. An operator may for example execute step 1431 to place an item into the rapid onboarding system. If the system supports capture of images from multiple angles (as does the embodiment shown in FIGS. 9 through 13C), this step may need to be performed only once, and no subsequent manual steps may be needed to capture all necessary data for this item. The system then automatically executes procedures 1432 to cycle through background colors, to turn on or off foreground lights or to set their intensities, to turn on or off the transparency of the electrochromic or similar platform, and to capture images of the item using all of the system's cameras. Images may then be processed to mask out backgrounds (as described above), resulting in item images 1401. These images may include for example top images such as 1131 and bottom images such as 1203. Additional data such as weight 1120 may also be captured. The data may be processed in step 1403 to generate training images 1411 from multiple viewpoints. This processing may also generate a 3D model 1412 of the item, which may include for example the shape, size, and volume of the item. The 3D model may be generated for example using stereo vision techniques that take into account the known positions and orientations 1402 of the system cameras. Sensor data 1120 may be processed to estimate the item's weight 1413. Images 1411 may be incorporated into training dataset 121, as described above, which may be used to train an item classifier 130. Additional item data such as 3D model information 1412, weight 1413, or other sensor data may be stored in a database of item attributes 1414. These attributes 1414 may also be used by item classifier 130; in one or more embodiments they may also be used to determine the quantity of items taken from a shelf or similar storage area.

While the invention herein disclosed has been described by means of specific embodiments and applications thereof, numerous modifications and variations could be made thereto by those skilled in the art without departing from the scope of the invention set forth in the claims.

What is claimed is:

1. A multi-angle rapid onboarding system for visual item classification comprising:
   an item imaging system into which each item of a plurality of items is placed, said item imaging system comprising
      a platform onto which said each item is placed, said platform comprising a transparent state and a non-transparent state;
      one or more backgrounds, each configured to display a plurality of background colors;
      a plurality of cameras in different positions, each camera of said plurality of cameras oriented to view said each item, wherein each point of an external surface of said each item is visible to at least one camera of said plurality of cameras when said each item is placed onto said platform;
      at least one controller coupled to said plurality of cameras, and to said one or more backgrounds, wherein said at least one controller is configured to
         transmit commands to said one or more backgrounds to successively display each background color of said plurality of background colors;
         command said plurality of cameras to capture images from said each camera of said plurality of cameras;
   an item classifier training system coupled to said item imaging system, comprising a processor configured to
      generate a training dataset based on said images associated with said each camera and with said each item, wherein said training dataset comprises training images of said each item labeled with an identifier of said each item;
      train an item classifier with said training dataset, wherein said item classifier inputs an image and outputs an identity of an item in said image.

2. The multi-angle rapid onboarding system of claim 1, wherein said plurality of background colors comprises two or more different colors, each having a different hue.

3. The multi-angle rapid onboarding system of claim 1, wherein said one or more backgrounds comprise one or more monitor screens.

4. The multi-angle rapid onboarding system of claim 1, wherein said one or more backgrounds comprise
   one or more translucent panels; and,
   a plurality of controllable lights behind each translucent panel of said one or more translucent panels.

5. The multi-angle rapid onboarding system of claim 4, wherein one or more of said one or more translucent panels comprise a transparent state and a non-transparent state.

6. The multi-angle rapid onboarding system of claim 5, wherein
   said one or more of said one or more translucent panels comprise an electrochromic material; and,
   said at least one controller is coupled to said electrochromic material and is further configured to transmit transparency commands to said electrochromic material to set said one or more of said one or more translucent panels into said transparent state or into said non-transparent state.

7. The multi-angle rapid onboarding system of claim 4, further comprising a plurality of controllable bottom lights below said platform;
wherein
said platform is translucent when it is in said non-transparent state.

8. The multi-angle rapid onboarding system of claim 1, wherein
said plurality of cameras comprises at least one camera oriented to view a bottom side of said each item through said platform when said platform is in said transparent state.

9. The multi-angle rapid onboarding system of claim 1, wherein
said platform comprises an electrochromic material; and,
said at least one controller is coupled to said electrochromic material and is further configured to transmit transparency commands to said electrochromic material to set said platform into said transparent state or into said non-transparent state.

10. The multi-angle rapid onboarding system of claim 1, wherein said plurality of cameras comprises at least one camera proximal to a top edge of each wall of said item imaging system.

11. The multi-angle rapid onboarding system of claim 10, wherein said plurality of cameras further comprises at least two cameras proximal to said top edge of each wall of said item imaging system.

12. The multi-angle rapid onboarding system of claim 11, wherein said plurality of cameras further comprises at least one camera oriented to view a bottom side of said each item through said platform when said platform is in said transparent state.

13. The multi-angle rapid onboarding system of claim 12, wherein said plurality of cameras further comprises at least two cameras oriented to view said bottom side of said each item through said platform when said platform is in said transparent state.

14. The multi-angle rapid onboarding system of claim 1, further comprising a weight sensor configured to obtain a weight of said each item when said each item is placed onto said platform.

15. The multi-angle rapid onboarding system of claim 1, wherein said generate said training dataset comprises
analyze said images from said each camera of said plurality of cameras to obtain a mask of said each item in said images from said each camera of said plurality of cameras;
apply said mask of said each item to said images from said each camera of said plurality of cameras to obtain foreground images of said each item;
generate said training images of said each item based on said foreground images of said each item.

16. The multi-angle rapid onboarding system of claim 15, wherein said generate said training images of said each item comprises
modify one or more of a scale, a rotation, a color, and an occlusion of said foreground images to form modified foreground images; and,
add said modified foreground images to background images to form said training images.

17. The multi-angle rapid onboarding system of claim 15, wherein said analyze said images from said each camera of said plurality of cameras to obtain said mask comprises
calculate a hue difference comprising a difference between
a hue channel of a first image of said images from said each camera of said plurality of cameras corresponding to a first background color, and
a hue channel of a second image of said images from said each camera of said plurality of cameras corresponding to a second background color different from said first background color;
calculate said mask based on a region in said hue difference comprising values below a threshold value.

18. The multi-angle rapid onboarding system of claim 1, further comprising
an image processor configured to calculate a 3D model of said each item based on said images from said each camera of said plurality of cameras.

19. The multi-angle rapid onboarding system of claim 18, wherein said image processor is further configured to calculate one or more of a shape, a size, and a volume of said each item.

20. A multi-angle rapid onboarding system for visual item classification comprising:
an item imaging system into which each item of a plurality of items is placed, said item imaging system comprising
a platform onto which said each item is placed, said platform comprising an electrochromic material with a transparent state and a non-transparent state;
a plurality of controllable bottom lights below said platform;
one or more backgrounds, each configured to display a plurality of background colors, wherein
said plurality of background colors comprises two or more different colors each having a different hue;
each background of said one or more backgrounds comprises a translucent panel; and
a plurality of controllable lights behind said translucent panel;
a plurality of cameras in different positions, each camera of said plurality of cameras oriented to view said each item, wherein
each point of an external surface of said each item is visible to at least one camera of said plurality of cameras when said each item is placed onto said platform;
said plurality of cameras comprises
at least two cameras proximal to a top edge of each wall of said item imaging system; and
at least two cameras oriented to view a bottom side of said each item through said platform when said platform is in said transparent state;
at least one controller coupled to said plurality of cameras, to said plurality of controllable lights behind said translucent panel, and to said plurality of controllable bottom lights below said platform, wherein said at least one controller is configured to
transmit transparency commands to said electrochromic material to set said platform into said transparent state or into said non-transparent state;
transmit commands to said plurality of controllable lights behind said translucent panel, and to said plurality of controllable bottom lights below said platform to successively display each background color of said plurality of background colors;
capture images from said each camera of said plurality of cameras corresponding to said each background color;
an item classifier training system coupled to said item imaging system, comprising a processor configured to generate a training dataset based on said images associated with said each camera and with said each item, wherein said training dataset comprises training images of said each item labeled with an identifier of said each item;

train an item classifier with said training dataset, wherein said item classifier inputs an image and outputs an identity of an item in said image; and, an image processor configured to calculate a 3D model of said each item based on said images from said each camera of said plurality of cameras.

\* \* \* \* \*